United States Patent
Alvez

(10) Patent No.: US 10,003,960 B2
(45) Date of Patent: Jun. 19, 2018

(54) SYSTEMS AND METHODS FOR RESTRICTING A MOBILE COMMUNICATION DEVICE

(71) Applicant: Ramona E. Alvez, Mill Valley, CA (US)

(72) Inventor: Ramona E. Alvez, Mill Valley, CA (US)

(*) Notice: Subject to any disclaimer, the term of this patent is extended or adjusted under 35 U.S.C. 154(b) by 0 days. days.

(21) Appl. No.: 14/959,886

(22) Filed: Dec. 4, 2015

(65) Prior Publication Data
US 2016/0183079 A1    Jun. 23, 2016

Related U.S. Application Data

(60) Provisional application No. 62/095,823, filed on Dec. 23, 2014.

(51) Int. Cl.
*H04M 3/00* (2006.01)
*H04W 8/22* (2009.01)
*H04W 4/12* (2009.01)
*H04W 48/04* (2009.01)

(52) U.S. Cl.
CPC .............. *H04W 8/22* (2013.01); *H04W 4/12* (2013.01); *H04W 48/04* (2013.01)

(58) Field of Classification Search
CPC .................. H04W 8/22; H04W 4/12
See application file for complete search history.

(56) References Cited

U.S. PATENT DOCUMENTS

| | | | | |
|---|---|---|---|---|
| 2013/0084847 A1* | 4/2013 | Tibbitts | ................. | H04W 8/245 455/419 |
| 2014/0309864 A1* | 10/2014 | Ricci | ..................... | H04W 48/04 701/36 |
| 2015/0079965 A1* | 3/2015 | Mullins | ................. | H04W 12/08 455/419 |
| 2015/0334545 A1* | 11/2015 | Maier | ................... | H04W 4/005 455/404.2 |

* cited by examiner

*Primary Examiner* — Chuck Huynh
(74) *Attorney, Agent, or Firm* — Kinter IP, LLC; Mary Frances Ludwig

(57) ABSTRACT

A system and method for restricting cell phone use while operating a vehicle. The operation and functionality of a subject mobile communication device (MCD) is restricted during operation of a subject vehicle. A control/monitor communication device (controller) installs a functionality restriction application (FRA) on the subject MCD and registers the MCD to a server. The registration process associates a specific vehicle and specific functionality restrictions with the subject MCD. The vehicle may be associated with the subject MCD via an on-board module (OBM) integrated with an on-board diagnostic device of the vehicle. When the vehicle is operational, the OBM transmits a signal to the server. The server accesses the registration information and transmits a signal to the associated MCD. The signal activates the FRA as well as communication functionality so that if the subject MCD is within a threshold distance of the OBM it is restricted as specified.

17 Claims, 4 Drawing Sheets

SYSTEMS AND METHODS FOR RESTRICTING A MOBILE COMMUNICATION DEVICE

CROSS-REFERENCE TO RELATED APPLICATION

This application claims the priority of, U.S. Provisional Patent application No. 62/095,823, entitled "Systems and Methods for Restricting a Mobile Communication Device While Operating a Vehicle," filed on Dec. 23, 2014, the teachings of which are incorporated by reference herein.

FIELD

Embodiments of the invention relate generally to the field of mobile communication devices, and more specifically to restricting the use of mobile communications devices.

BACKGROUND

The use of mobile communication devices (MCD) and other portable electronic devices where such is prohibited can be distracting, irritating, or dangerous.

For example, the use of a MCD while operating a motor vehicle has been recognized as a safety problem for many years. This unsafe practice is prevalent among young and inexperienced drivers and especially in regard to texting (sending and receiving text messages).

Over the past several years this problem has been addressed in various ways including functionality that allows a MCD user to voluntarily suspend one or more communication features of the MCD while driving. While such schemes are relatively easy to implement, they are not always employed by the MCD user, especially among inexperienced drivers who do not fully comprehend the extent of impairment due to texting.

Other conventional schemes compel a restriction of selected features of the MCD, but they are more complex and consequently costlier to implement. One such scheme determines if a MCD is within a specified area of a vehicle that is currently being operated and if so, notifies a service provider of the MCD to suspend or restrict communication features of the MCD.

One conventional application is automatically enabled when the vehicle attains a threshold speed and is then disabled when the vehicle stops or falls below a threshold speed.

Another conventional scheme uses biometric identifiers for both the MCD and the motor vehicle. The biometric identifiers for each are compared to determine if the vehicle is being operated concurrently with a MCD by the same person. If so, the MCD is then restricted.

Other conventional schemes attempt to determine that a MCD user is not operating a vehicle. One such scheme prompts the MCD user for input with the assumption that if the user is sufficiently focused to be able to provide the input, then the user is not operating a vehicle. If the user is unable to provide the input, then the MCD is restricted.

Conventional approaches often implement an auto-reply to respond to text messages that are received during the restricted period, and some of the voluntary schemes implement a notification process when they are turned off, to, for example, alert a parent if a teen driver attempts to avoid the restriction.

The disadvantage of these conventional schemes and others, as well as numerous variations, is that they are voluntary and are often not employed or can easily be circumvented. For example, many conventional schemes use GPS signaling to determine if a vehicle is being operated. A vehicle operator may easily avoid MCD restrictions by disabling the GPS signaling. As discussed above, schemes in which the restrictions on the MCD are compulsory are complex and costly.

SUMMARY

For one embodiment of the invention, a system and method are disclosed wherein the operation and functionality of one or more subject mobile communication devices (MCDs) are restricted during operation of a subject vehicle. In accordance with one embodiment of the invention, a control/monitor communication device (controller) installs a functionality restriction application (FRA) on one or more subject MCDs and registers the MCDs to a server (e.g., cloud server). The registration process associates a specific vehicle and specific functionality restrictions with the subject MCDs. The vehicle may be associated with the subject MCDs via an on-board module (OBM) which may be integrated with an on-board diagnostic device of the vehicle. When the vehicle is operational, the OBM transmits a signal to the server. The server accesses the registration information of the OBM and transmits a signal to the associated MCDs. The signal activates the FRA as well as communication functionality so that subject MCDs within a threshold distance of the OBM are restricted as specified.

In alternative embodiments of the invention the controller installs the FRA on the subject MCDs. The FRA is then synched to the on-board module (OBM) of a subject vehicle. When the subject vehicle is operated, the OBM transmits a signal to one or more of the subject MCDs within a threshold distance of the subject vehicle. The signal activates the FRA on each of the subject MCDs thereby restricting selected functionality of the subject MCDs.

Alternative embodiments of the invention may be employed in various settings and circumstances in which it is desired to restrict the operation and functionality of one or more subject MCDs. For example, alternative embodiments of the invention may restrict the operation and functionality of MCDs in educational, commercial, or social settings, among others. For such embodiments, an activation signal to activate the FRA may be communicated to the subject MCDs in response to a circumstance-appropriate trigger. Such trigger may be, for example, the commencement of an educational, commercial, or social event.

Other features and advantages of embodiments of the present invention will be apparent from the accompanying drawings, and from the detailed description, that follows below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

A system and method for restricting the operation of a mobile communication device (MCD) are disclosed. A control/monitor communication device (controller) installs a functionality restriction application (FRA) on one or more subject MCDs and registers the MCDs to a server (e.g., cloud server). The registration process associates a specific vehicle and specific functionality restrictions with the subject MCDs. The vehicle may be associated with the subject MCDs via an on-board module (OBM) which may be integrated with an on-board diagnostic device of the vehicle. When the vehicle is operational, the OBM transmits a signal to the server. The server accesses the registration information of the OBM and transmits a signal to the associated MCDs. The signal activates the FRA as well as communication functionality so that subject MCDs within a threshold distance of the OBM are restricted as specified. When activated, the FRA restricts functionality of the subject MCDs. Once the subject vehicle is no longer being operated, the FRA is deactivated and functionality of the subject MCDs is restored.

In the following description, numerous specific details are set forth. However, it is understood that embodiments of the invention may be practiced without these specific details. In other instances, well-known circuits, structures, systems and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. Moreover, inventive aspects lie in less than all features of a single disclosed embodiment. Thus, the claims following the Detailed Description are hereby expressly incorporated into this Detailed Description, with each claim standing on its own as a separate embodiment of this invention. Embodiments of the invention are applicable in a variety of settings in which it is desired to restrict the functionality and operation of a MCD while a vehicle is operated.

Exemplary Embodiment

Figure 1:
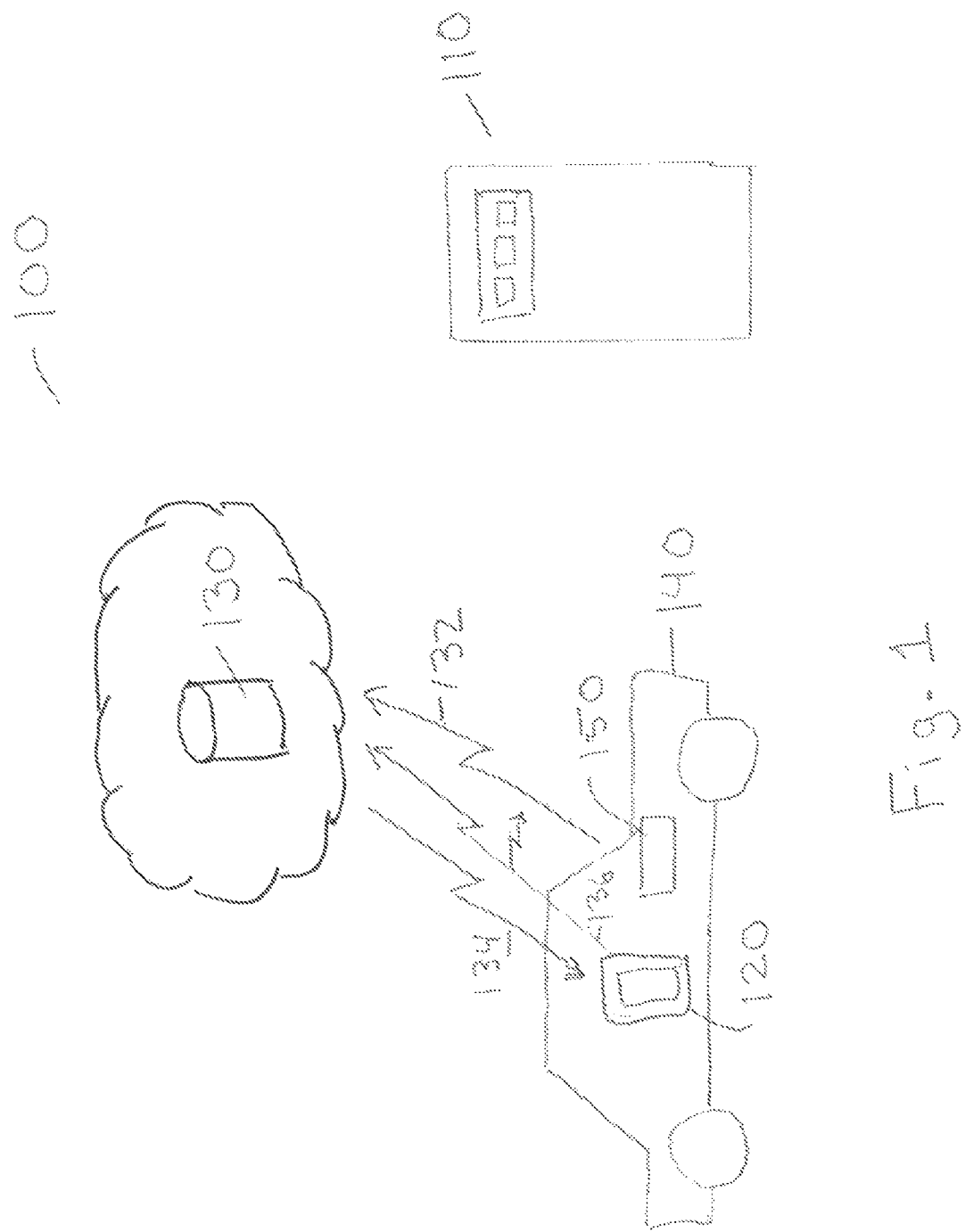
FIG. 1 illustrates a system in which a functionality restriction application for a mobile communication device is employed in accordance with one embodiment of the invention.

FIG. 1 illustrates a system 100 in which a functionality restriction application (FRA) for a mobile communication device is employed. System 100, shown in FIG. 1, includes a control/monitor communication device (controller) 110. The controller 110 may be any device capable of storing, processing, and communicating information in accordance with embodiments of the invention described herein. For example, the controller may be a personal computer, notebook, tablet, or smartphone, among other devices.

The controller 110 has implemented thereon a FRA (not shown). Prior to use, the controller installs the FRA to one or more subject MCDs, shown for example, as subject MCD 120. In accordance with one embodiment of the invention, the subject MCD 120 has no administrative control over the FRA. The subject MCD 120 cannot disable or modify the FRA. The controller also registers the subject MCDs to a server, shown for example, as cloud server 130. The registration process associates one or more MCDs with a specific vehicle 140 and specific functionality restrictions. The MCDs are associated with the vehicle through registration of the OBM 150 which may be integrated with the on-board diagnostic device of the vehicle 140. The registration process in accordance with one embodiment of the invention is described more fully below in reference to FIG. 3.

In use, when the vehicle is operational (i.e., the engine is turned on), the OBM 150 communicates an identification signal 132 to the server 130. The identification signal indicates to the server that the subject vehicle is operational. The identification signal 132 may be any suitable communication signal, for example, a GSM or CDMA signal.

The server 130 accesses the association information based on the identification signal that identified the OMB 150, the associated vehicle 140 and the associated MCD 120. The server then transmits an activation signal 134 to the subject MCD 120 to activate the FRA installed thereon. The activation signal may be, for example, a short message service (SMS) signal. The activation also activates a short distance wireless technology standard such as Bluetooth on the subject MCD 120 to synch to the OBM 150. The MCD 120 may transmit a synch confirmation signal 136 to the server 130 and the controller 110 if desired.

The server may also send a notification signal to the controller 110 to indicate that the vehicle 140 is in operation and that the FRA has been activated on the subject MCD 120.

Upon activation the FRA disables selected functionality of the subject MCD 120. The functionality that is disabled by the FRA is selected by the user of the controller 110. For one embodiment the selected functionality is determined prior to or during a registration process as described above. Alternatively, the controller may select functionality to be disabled at other times. Alternatively, the FRA may restrict all functionality of the MCD or may restrict all functionality except that selected by the controller.

For one embodiment of the invention, the selected functionality that is restricted may include sending and receiving test messages and other personal communication. For one such embodiment any text messages received while the subject MCD is restricted are held by the FRA which may also send a return message to notify the sender that the functionality of the subject MCD is temporarily restricted.

For one embodiment, selected functionality may remain enabled. For example, MCD applications such as music applications as well as emergency functionality (e.g., 911 functionality) may remain enabled. In one such embodiment, upon the MCD employing emergency functionality, the controller/monitor communication device is notified and provided with the MCD location (e.g., GPS data).

For one embodiment of the invention, the activation signal is communicated using a short distance wireless technology standard such as Bluetooth so that only the MCDs that have the FRA installed and that are within a short distance of the vehicle OBM will be restricted. For example, if a parent has synched the FRA to the family car and has downloaded the FRA to several of their children's smartphones, then only their children using the family car will have their phone restricted. The phones of passengers in the vehicle and phones that are not in the immediate vicinity of the OBM of the vehicle will not be restricted.

After activation of the FRA, the subject MCD will have restricted functionality as specified by the controller until the subject vehicle is no longer being operated (i.e., the engine is turned off). When the engine is disengaged, the OBM of the subject vehicle transmits a signal to the FRA which ceases the restriction of the subject MCD. All text messages and other communication that had been held during operation of the vehicle are now accessible by the subject MCD.

The foregoing is intended to provide a brief general description of a suitable environment in which the invention may be implemented. It should be understood, however, that handheld, portable and other computing devices and computing objects of all kinds are contemplated for use in connection with the invention. Thus, while elements of exemplary embodiments of the invention are described as an OBM, MCD, or control/monitor communication device, these are exemplary devices and the invention may be implemented with other computing devices, and software operational schemes.

In general, anywhere that data may be stored, or from which data may be retrieved, is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers or other processing devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Computing systems, environments, and/or configurations that may be suitable for use with the invention include, but are not limited to, personal computers (PCs), server computers, smartphones, hand-held or laptop devices, multi-processor systems, microprocessor-based systems, programmable consumer electronics, network PCs, appliances, minicomputers, mainframe computers and the like. The invention may also be practiced in distributed computing environments where tasks are performed by remote processing devices that are linked through a communications network or other data transmission medium.

Figure 2:
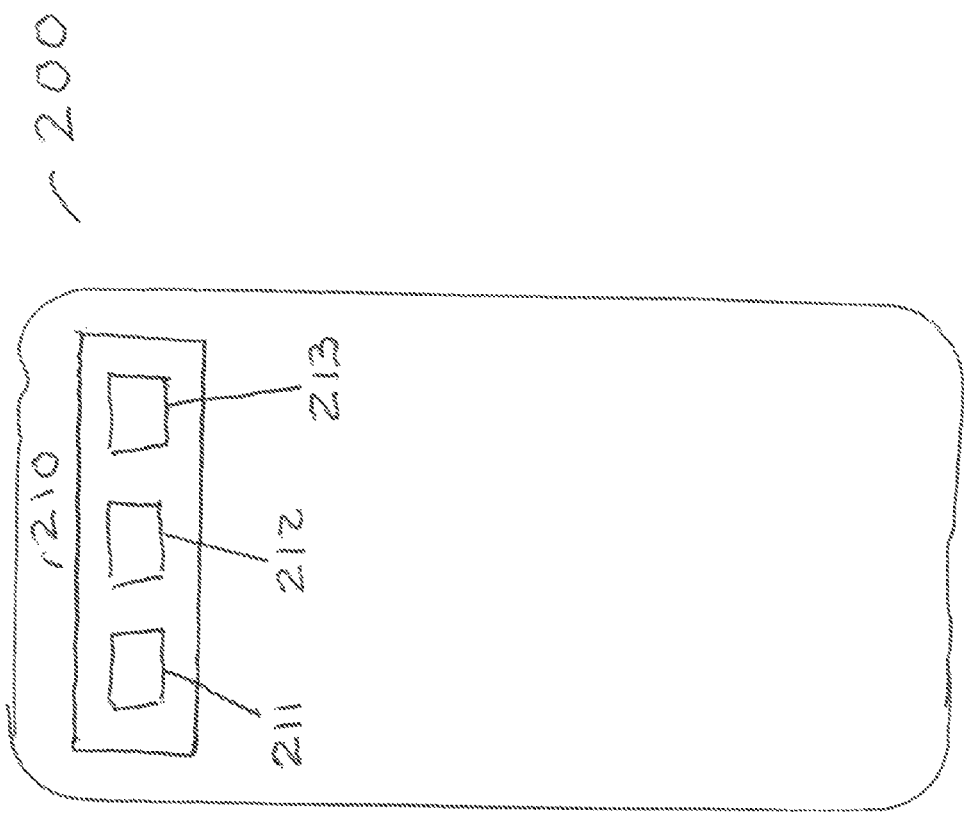
FIG. 2 illustrates a mobile communication device display in accordance with one embodiment of the invention.

FIG. 2 illustrates a mobile communication device display in accordance with one embodiment of the invention. As discussed above the controller may be used to register the subject MCDs and may receive a notification signal from the server upon the activation/deactivation of the FRA. Controller 200, shown in FIG. 2, includes an application that provides a set of indicators 210. The indicators may provide information regarding the activation and use of the FRA. For example, the display may include an indicator 211 to indicate whether the subject vehicle is operational. Another indicator 212 may be displayed to indicate whether the FRA is activated and restricting the MCD as desired. For one embodiment of the invention, if the OBM is removed or disabled or not functioning, a nonfunctioning notification will be forwarded to the controller. The display may have an indicator 213 to indicate such a disabled status. This ensures that the controller will be aware when the restrictions on the subject MCDs are not in effect. Additionally, or alternatively, for one embodiment of the invention if the OBM is removed or disabled, the server automatically transmits a signal that restricts or disables the subject MCD and notifies the controller.

In alternative embodiments, the display may display other information regarding the subject vehicle or the subject MCDs. Such information may include, for example, the location of the subject vehicle or the use of emergency functionality by the subject MCDs.

Figure 3:
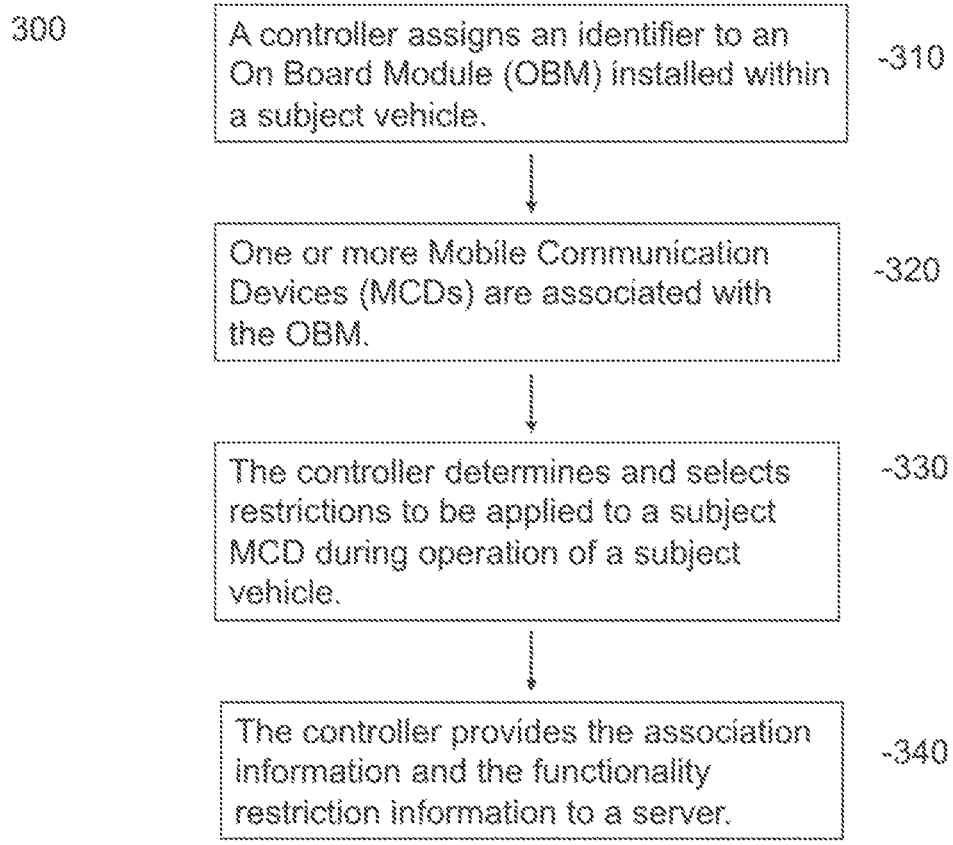
FIG. 3 illustrates a process in which a mobile communication device association is registered to a server in accordance with one embodiment of the invention.

As discussed above, one or more mobile communication devices are associated with a specific vehicle and with specific functionality restrictions. FIG. 3 illustrates a process in which a mobile communication device association is registered to a server in accordance with one embodiment of the invention. Process 300, shown in FIG. 3 begins with operation 310 in which the controller assigns an identifier to an OBM installed within a subject vehicle. The identifier may be, for example, a numeric identifier.

At operation 320 one or more MCDs, having the FRA installed thereon, are associated with the OBM. For example, the OBM identifier is associated with each of the phone numbers of one or more MCDs.

At operation 330 the controller determines and selects restrictions to be applied to a subject MCD during operation of a subject vehicle. As discussed above in reference to FIG. 1, the controller may select specific functionality that will be restricted by the FRA while the subject vehicle is operating. For example, the controller may select texting functionality and other communication functionality known to be a dangerous distraction to drivers. Alternatively, the controller may specify that all functionality of the subject MCD is to be restricted or that only specific functionality will be available while the vehicle is operating.

At operation 340 the controller provides the association information and the functionality restriction information to a server. The server is a computing device or program that manages access to a centralized resource or service in a network of computing devices. For one embodiment, the server may be a cloud server, for example, one or more of a network of remote servers hosted on the Internet. At this point the registration process is complete and the restrictive functionality system is operational.

Figure 4:
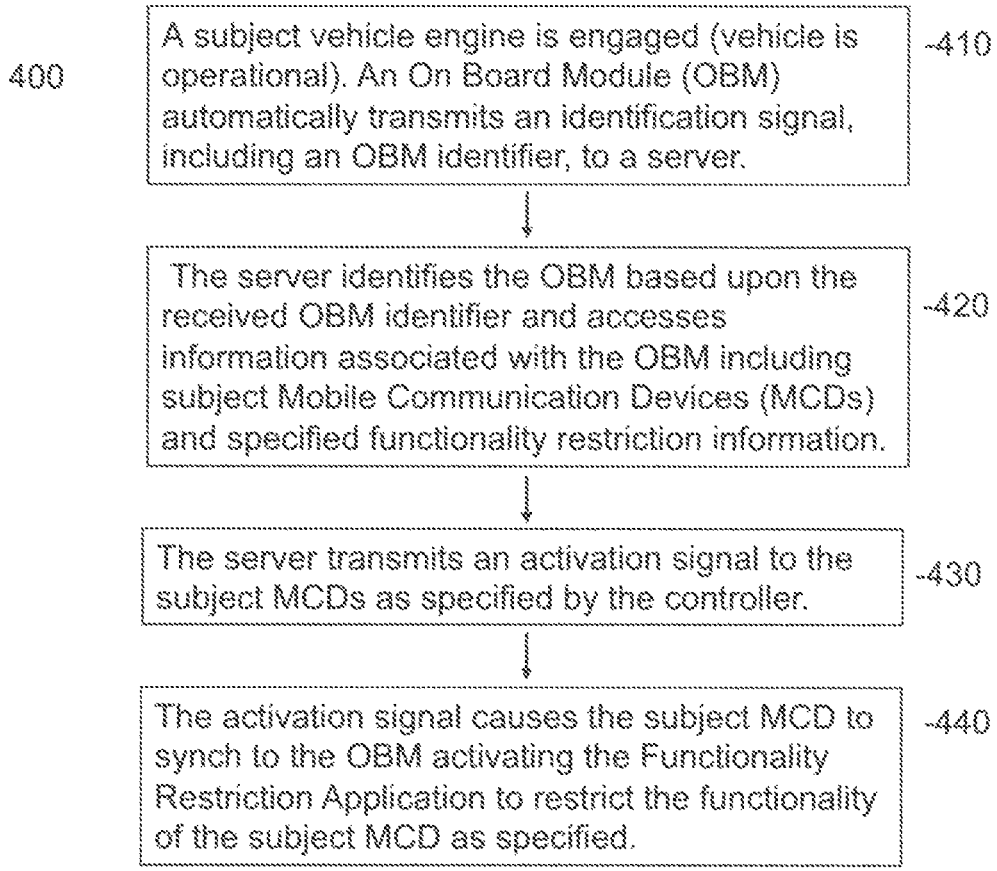
FIG. 4 illustrates a process in which a functionality restriction application is used to restrict selective functionality of a mobile communication device while a vehicle is operated in accordance with one embodiment of the invention.

FIG. 4 illustrates a process in which a functionality restriction application is used to restrict selective functionality of a mobile communication device while a vehicle is operated in accordance with one embodiment of the invention. Process 400, shown in FIG. 4, begins with operation 410 in which a subject vehicle engine is engaged. This triggering event causes the OBM to automatically transmit an identification signal, including an OBM identifier, to the server. For embodiments in which the OBM is integrated with the on board diagnostic device of the vehicle, the operation of the vehicle may be determined by reference to data provided by the on board diagnostic device (e.g., engine crankshaft rotations per minute (RPM)). In general, an identification signal is transmitted to the server upon the occurrence of a specified triggering event.

At operation 420 the server identifies the OBM based upon the received OBM identifier and accesses the information associated with the OBM, such as the subject MCDs and specified functionality restriction information as provided through the registration process as discussed above in reference to FIG. 3.

At operation 430 the server transmits an activation signal to the subject MCDs. For one embodiment, the server may transmit the activation signal to all associated MCDs concurrently. Alternatively, the server may transmit the activation signal to a first associated MCD and, if no synch confirmation is received, the server may transmit the activation signal to other associated MCDs as prioritized by the controller.

At operation 440 the activation signal causes the subject MCD to synch to the OBM and the FRA is activated to restrict the functionality of the subject MCD as specified while the subject vehicle is operational.

Additionally, the server may transmit a notification signal to the controller to indicate that the FRA is restricting the functionality of the MCD as desired.

The functionality restrictions on the subject MCD remain in effect while the subject vehicle is operational. A signal is received from the OBM periodically to indicate the subject vehicle is still operational. As discussed above, if the OBM is removed or disabled during operation of the vehicle, a nonfunctioning notification signal may be transmitted to the control communication device.

When the vehicle is no longer in operation, the OBM transmits a signal to the server to deactivate the FRA. The server then transmits a deactivation signal to the subject MCD. Upon deactivation of the FRA, the subject MCD is fully functional, providing access to information restricted by the FRA during operation of the vehicle. For example, if text messaging was restricted by the FRA during operation of the vehicle, the received text messages are accessible upon deactivation of the FRA.

Embodiments of the invention, as discussed above in reference to FIGS. 1-4 may be used in a variety of circumstances in which a user desires to restrict the use of one or more subject MCDs while a vehicle is operated. For example, embodiments of the invention may be used by a parent to ensure that their children are not texting while driving their car or may be used by an employer to ensure that employees are not using various features of a MCD while operating a company vehicle.

As discussed above, alternative embodiments of the invention may be employed in various settings and circumstances in which it is desired to restrict the operation and functionality of one or more subject MCDs. For example, alternative embodiments of the invention may restrict the operation and functionality of MCDs in educational, commercial, or social settings, among others. For such embodiments, an activation signal to activate the FRA may be communicated to the subject MCDs in response to a circumstance-appropriate trigger. Such trigger may be, for example, the commencement of an educational, commercial, or social event. For example, in general, a server may receive a notification signal that notifies the server that an event has occurred to trigger the activation of the FRA.

Embodiments of the invention have been described as including various operations. Many of the processes are described in their most basic form, but operations can be added to or deleted from any of the processes without departing from the scope of the invention. The operations of the invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the invention may be used in conjunction with any mobile operating system (e.g., IOS and Android), and may be provided as a computer program product that may include a machine-readable medium having stored thereon instructions, which may be used to program a computer (or other electronic devices) to perform a process according to the invention. The machine-readable medium may include, but is not limited to, magneto-optical disks, ROMs, RAMs, EPROMs, EEPROMs, magnetic or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
providing a server in direct communication with a mobile communication device (MCD), an on board module (OBM) of a vehicle, and a controller/monitor communication device;
the controller/monitor communication device registering the MCD and the OBM to the server, associating the MCD with the OBM, and installing a functionality restriction application on the MCD;
synchronizing the functionality restriction application to the OBM;
the server receiving an identification signal from the OBM, the identification signal indicating that the vehicle is operational;
accessing association information that associates the vehicle with the MCD and a set of functionality restrictions;
the server activating a short distance wireless technology standard on the MCD;
when the MCD is within a threshold distance of the vehicle, the MCD synching to the OBM and the server receiving a synch confirmation signal;
the server transmitting an activation signal to the MCD, the activation signal activating the functionality restriction application;
when the MCD is within a threshold distance of the vehicle, the functionality restriction application restricting the MCD in accordance with the set of functionality restrictions;
the functionality restriction application storing data received by the MCD while the MCD is restricted; and,
wherein the MCD has no administrative control over the functionality restriction application and cannot disable or modify the functionality restriction application.

2. The method of claim 1, further comprising:
transmitting an activation notification signal to a controller/monitor communication device to indicate that the functionality restriction application of the MCD has been activated.

3. The method of claim 1, wherein the OBM of the vehicle is integrated with an on board diagnostic device of the vehicle.

4. The method of claim 1, wherein the MCD comprises a cellular telephone.

5. The method of claim 4, wherein the set of functionality restrictions includes restricting the communication of text messages and prohibiting display of text messages.

6. The method of claim 2, further comprising:
determining that the OBM is nonfunctioning; and
transmitting a nonfunctioning notification signal to the controller/monitor communication device.

7. The method of claim 3, wherein the OBM of the vehicle transmits an identification signal to a server based upon data provided by the on board diagnostic device.

8. The method of claim 7, wherein the data provided by the on board diagnostic device is an engine crankshaft rotations per minute data.

9. A system comprising:
a control communication device having stored thereon a functionality restriction application that allows a user thereof to specify a set of restrictions for a mobile communication device (MCD) and to download the functionality restriction application to the MCD;
an on board module (OBM) of a vehicle to determine if the vehicle is operational;
a subject MCD having implemented thereon the functionality restriction application, the subject MCD communicatively coupled to the OBM of the subject vehicle, and the functionality restriction application synchronized to the OBM of the subject vehicle;
a server for receiving association information that associates the OBM of a specific vehicle and specific functionality restrictions with the MCD through a registration process, the server in direct communication with the OBM and the MCD, the server configured to receive an identification signal from the OBM indicating that the subject vehicle is operational, the server configured to receive a synch confirmation signal indicating that the subject MCD is within a threshold distance of the subject vehicle and to transmit an activation signal to the subject MCD;
the activation signal configured to activate the functionality restriction application installed on the MCD;
when activated, the functionality restriction application configured to restrict functionality of the MCD in accordance with the specified set of restrictions;
the functionality restriction application configured to store data received by the MCD when the MCD is restricted; and,
wherein the MCD has no administrative control over the functionality restriction application and cannot disable or modify the functionality restriction application.

10. The system of claim 9, wherein the registration process comprises:
assigning an identifier to the OBM of the subject vehicle;
determining a set of functionality restrictions to be applied to the subject MCD during operation of the subject vehicle;
using the identifier to associate the subject MCD with the OBM; and
providing the server with the identifier, the set of functionality restrictions, and information identifying the subject MCD.

11. The system of claim 10 wherein the subject MCD is a cellular telephone and the information identifying the subject MCD is a telephone number of the cellular telephone.

12. The system of claim 11 wherein the set of functionality restrictions includes restricting the communication of text messages and prohibiting display of text messages.

13. The system of claim 10, wherein the server transmits an activation notification signal to the control communication device to indicate that the functionality restriction application of the MCD has been activated.

14. The system of claim 10, wherein the OBM of the vehicle is integrated with an on board diagnostic device of the vehicle.

15. The system of claim 13, wherein, upon determining that the OBM is nonfunctioning, the server transmits a nonfunctioning notification signal to the control communication device.

16. The system of claim 14, wherein the OBM of the vehicle transmits an identification signal to the server based upon data provided by the on board diagnostic device.

17. The system of claim 16, wherein the data provided by the on board diagnostic device is an engine crankshaft rotations per minute data.

* * * * *

UNITED STATES PATENT AND TRADEMARK OFFICE
CERTIFICATE OF CORRECTION

PATENT NO.         : 10,003,960 B2
APPLICATION NO.    : 14/959886
DATED              : June 19, 2018
INVENTOR(S)        : Ramona E. Alves Page 1 of 1

It is certified that error appears in the above-identified patent and that said Letters Patent is hereby corrected as shown below:

On the Title Page

At (12), "Alvez" should read --Alves--
At (71), Applicant: "Alvez" should read --Alves--
At (72), Inventor: "Alvez" should read --Alves--
At (74), Attorney, Agent, or Firm: "Kinter IP" should read --Kintner IP--

Signed and Sealed this
Twenty-eighth Day of August, 2018

Andrei Iancu
*Director of the United States Patent and Trademark Office*